(12) United States Patent
Thiel et al.

(10) Patent No.: US 9,780,344 B2
(45) Date of Patent: Oct. 3, 2017

(54) PORTABLE BATTERY PACK COMPRISING A BATTERY ENCLOSED BY A WEARABLE AND REPLACEABLE POUCH OR SKIN

(71) Applicant: LAT Enterprises, Inc., Raleigh, NC (US)

(72) Inventors: Laura Thiel, Raleigh, NC (US); Giancarlo Urzi, Raleigh, NC (US)

(73) Assignee: LAT ENTERPRISES, Raleigh, NC (US)

( * ) Notice: Subject to any disclaimer, the term of this patent is extended or adjusted under 35 U.S.C. 154(b) by 123 days.

(21) Appl. No.: 14/520,821

(22) Filed: Oct. 22, 2014

(65) Prior Publication Data
US 2016/0118634 A1    Apr. 28, 2016

(51) Int. Cl.
| | |
|---|---|
| *H01M 2/06* | (2006.01) |
| *H01M 2/10* | (2006.01) |
| *A41D 1/00* | (2006.01) |
| *A41D 1/04* | (2006.01) |
| *A41D 13/015* | (2006.01) |
| *A45F 5/02* | (2006.01) |
| *A45C 11/00* | (2006.01) |
| *A45C 13/10* | (2006.01) |
| *A41D 27/20* | (2006.01) |

(52) U.S. Cl.
CPC .......... *H01M 2/1061* (2013.01); *A41D 1/002* (2013.01); *A41D 1/04* (2013.01); *A41D 13/015* (2013.01); *A45C 11/00* (2013.01); *A45C 13/10* (2013.01); *A45F 5/02* (2013.01); *H01M 2/1016* (2013.01); *A41D 27/205* (2013.01); *A45F 2005/023* (2013.01); *H01M 2220/30* (2013.01)

(58) Field of Classification Search
CPC .. H01M 2/1061; H01M 2220/30; A41D 1/04; A41D 1/002; A41D 13/015
USPC ................................................. 224/675, 930
See application file for complete search history.

(56) References Cited

U.S. PATENT DOCUMENTS

| | | | | |
|---|---|---|---|---|
| 1,901,232 A | * | 3/1933 | Glowacki | F21V 21/02 174/491 |
| 2,096,376 A | * | 10/1937 | Lauppe | A45F 5/00 224/240 |
| RE21,577 E | * | 9/1940 | Brownlee | D06F 75/28 219/247 |
| 2,447,053 A | * | 8/1948 | Bosley | A45C 11/38 190/37 |
| 2,450,369 A | * | 9/1948 | Bellis | H01R 13/562 439/448 |

(Continued)

OTHER PUBLICATIONS

International Search Report and Written Opinion dated Jan. 21, 2016 for a corresponding International Application PCT/US2015/056634.

*Primary Examiner* — Justin Larson
*Assistant Examiner* — Phillip Schmidt
(74) *Attorney, Agent, or Firm* — Neo IP

(57) ABSTRACT

A portable battery pack comprising a battery enclosed by a wearable and replaceable pouch or skin is disclosed, wherein the pouch or skin can be provided in different colors and/or patterns. Further, the pouch or skin can be MOLLE-compatible. The battery comprises a battery element housed between a battery cover and a back plate, wherein the battery element, battery cover, and back plate have a slight curvature or contour. Further, the battery comprises flexible leads.

20 Claims, 14 Drawing Sheets

(56) References Cited

U.S. PATENT DOCUMENTS

| | | | | |
|---|---|---|---|---|
| 2,501,725 A * | 3/1950 | Knopp | G01R 19/145 | 324/145 |
| 2,798,896 A * | 7/1957 | Bly | H01M 2/105 | 429/127 |
| 3,023,259 A * | 2/1962 | Coler | H01M 4/24 | 429/127 |
| 3,375,136 A * | 3/1968 | Biggar | H01M 2/021 | 205/160 |
| 3,919,615 A * | 11/1975 | Niecke | H01M 10/46 | 224/663 |
| 3,968,348 A * | 7/1976 | Stanfield | A01K 7/027 | 219/528 |
| 4,481,458 A * | 11/1984 | Lane | H01M 2/105 | 320/112 |
| 4,748,344 A * | 5/1988 | Sing | F21L 15/10 | 307/149 |
| 4,796,790 A * | 1/1989 | Hamilton | A45C 11/00 | 206/438 |
| 4,923,105 A * | 5/1990 | Snyder | A45F 3/14 | 224/232 |
| 5,019,767 A * | 5/1991 | Shirai | H01M 2/105 | 224/902 |
| 5,211,321 A * | 5/1993 | Rodriguez | A41D 13/0012 | 2/102 |
| 5,234,420 A * | 8/1993 | Horton | A61F 5/4408 | 224/663 |
| 5,267,679 A * | 12/1993 | Kamaya | A45C 7/0086 | 190/102 |
| 5,494,157 A * | 2/1996 | Golenz | A45C 3/02 | 190/111 |
| 5,533,618 A * | 7/1996 | Pickels, Jr. | A61B 50/24 | 206/363 |
| 5,537,022 A * | 7/1996 | Huang | H02J 7/0042 | 320/107 |
| 5,570,824 A * | 11/1996 | Lyon | A45F 3/00 | 224/148.5 |
| 5,622,346 A * | 4/1997 | Story, Jr. | A45F 5/02 | 224/148.6 |
| 5,653,367 A * | 8/1997 | Abramson | A45F 3/14 | 224/197 |
| 5,680,026 A * | 10/1997 | Lueschen | A45F 5/00 | 224/674 |
| 5,711,469 A * | 1/1998 | Gormley | A45F 5/02 | 224/236 |
| 5,724,707 A * | 3/1998 | Kirk | A41D 13/0012 | 2/102 |
| 6,092,702 A * | 7/2000 | Cassidy, IV | A45C 7/0063 | 224/153 |
| 6,152,338 A * | 11/2000 | Smith | A01K 97/10 | 224/149 |
| 6,158,642 A * | 12/2000 | Herbage | A45F 5/021 | 224/240 |
| 6,257,473 B1 * | 7/2001 | Ringelstetter | E01H 1/1206 | 119/795 |
| 6,259,228 B1 | 7/2001 | Becker et al. | | |
| 6,279,804 B1 * | 8/2001 | Gregg | A45F 5/02 | 2/255 |
| 6,303,248 B1 * | 10/2001 | Peterson | H01M 2/105 | 429/100 |
| 6,345,751 B1 * | 2/2002 | Elliot | A45F 3/04 | 224/640 |
| 6,364,187 B1 * | 4/2002 | Castellano | A45F 5/02 | 224/236 |
| 6,380,713 B2 * | 4/2002 | Namura | H01M 2/105 | 320/112 |
| 6,629,628 B1 * | 10/2003 | Canepari | A45C 1/04 | 150/112 |
| 6,727,197 B1 * | 4/2004 | Wilson | G06K 19/041 | 174/117 F |
| 6,886,724 B2 * | 5/2005 | Hung | A44B 11/001 | 224/152 |
| 7,074,520 B2 * | 7/2006 | Probst | A61N 1/375 | 429/176 |
| 7,080,430 B2 * | 7/2006 | Wemmer | A41D 13/0012 | 24/3.7 |
| 7,141,330 B2 * | 11/2006 | Aoyama | H01M 2/105 | 429/100 |
| 7,240,404 B2 * | 7/2007 | Flossner | A41D 13/0012 | 2/101 |
| 7,694,862 B2 * | 4/2010 | Bergeron | A45F 5/02 | 224/665 |
| 8,002,159 B2 * | 8/2011 | Cragg | A45F 5/02 | 224/579 |
| 8,079,503 B1 * | 12/2011 | Yeates | A45C 7/0086 | 224/268 |
| 8,453,899 B1 * | 6/2013 | Calkin | A45F 5/02 | 224/675 |
| 8,523,029 B2 * | 9/2013 | Rogers | F41C 33/045 | 224/182 |
| 8,608,041 B1 * | 12/2013 | Adkisson | A45F 5/00 | 2/102 |
| 8,720,762 B2 * | 5/2014 | Hilliard | F42B 39/02 | 224/675 |
| D710,796 S * | 8/2014 | Ko | D13/103 | |
| 9,144,255 B1 * | 9/2015 | Perciballi | A41D 27/00 | |
| 2002/0017545 A1 * | 2/2002 | Badillo | A45C 9/00 | 224/675 |
| 2002/0018932 A1 * | 2/2002 | Chikada | H01M 2/1061 | 429/185 |
| 2002/0150815 A1 * | 10/2002 | Ehara | H01M 2/1061 | 429/90 |
| 2003/0003357 A1 * | 1/2003 | Tamai | H01M 2/0207 | 429/181 |
| 2005/0242143 A1 * | 11/2005 | Hassett | A45F 5/00 | 224/576 |
| 2007/0158380 A1 * | 7/2007 | Calkin | A41D 13/0012 | 224/675 |
| 2008/0017678 A1 * | 1/2008 | Anderson | A44C 5/003 | 224/221 |
| 2008/0277433 A1 * | 11/2008 | Karl | A45F 3/04 | 224/148.6 |
| 2009/0004909 A1 * | 1/2009 | Puzio | B25F 5/00 | 439/460 |
| 2009/0279810 A1 * | 11/2009 | Nobles | A45C 13/00 | 383/66 |
| 2009/0302076 A1 * | 12/2009 | Romano | A45F 3/14 | 224/199 |
| 2011/0191933 A1 * | 8/2011 | Gregory | A41D 13/0012 | 2/69 |
| 2012/0045929 A1 * | 2/2012 | Streeter | A45F 5/00 | 439/492 |
| 2012/0121965 A1 * | 5/2012 | Makino | H01M 2/22 | 429/156 |
| 2012/0180184 A1 * | 7/2012 | Crye | A41D 13/0007 | 2/69 |
| 2013/0294712 A1 * | 11/2013 | Seuk | A45F 3/04 | 383/117 |
| 2014/0072864 A1 * | 3/2014 | Suzuta | B32B 15/08 | 429/176 |
| 2015/0228935 A1 * | 8/2015 | Seong | H01M 2/0404 | 429/178 |
| 2015/0295617 A1 * | 10/2015 | Lai | H04B 1/3888 | 455/575.8 |

* cited by examiner

PORTABLE BATTERY PACK COMPRISING A BATTERY ENCLOSED BY A WEARABLE AND REPLACEABLE POUCH OR SKIN

TECHNICAL FIELD

The presently disclosed subject matter relates generally to portable equipment for military, aviation, personal survival, hiking, and camping applications and, more particularly, to a portable battery pack comprising a battery enclosed by a wearable and replaceable pouch or skin.

BACKGROUND

Portable power sources are used in, for example, military applications, aviation applications, wilderness and personal survival applications, hiking and camping applications, and disaster relief efforts. For example, portable battery packs exist for carrying in a backpack or for wearing on the body. These battery packs, however, can be heavy and inconvenient to access and connect to devices requiring electrical power. Further, some applications may require that the appearance of the battery pack blend with the environment in which they are used. Current battery packs, however, might not offer flexibility of appearance or the consumer is forced to buy one battery pack for one environment and a different battery pack for a different environment.

SUMMARY

In certain aspects, the presently disclosed subject matter provides a portable battery pack comprising a wearable pouch adapted to enclose one or more batteries, wherein the pouch has a first side and an opposite second side, a closable opening through which the one or more batteries can be fitted into the pouch, one or more openings through which one or more leads from the one or more batteries can be accessed, and wherein the pouch comprises a pouch attachment ladder system (PALS) adapted to attach the pouch to a load-bearing platform.

The presently disclosed portable battery pack is well-suited for use in military, aviation, personal survival, hiking, and camping applications.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
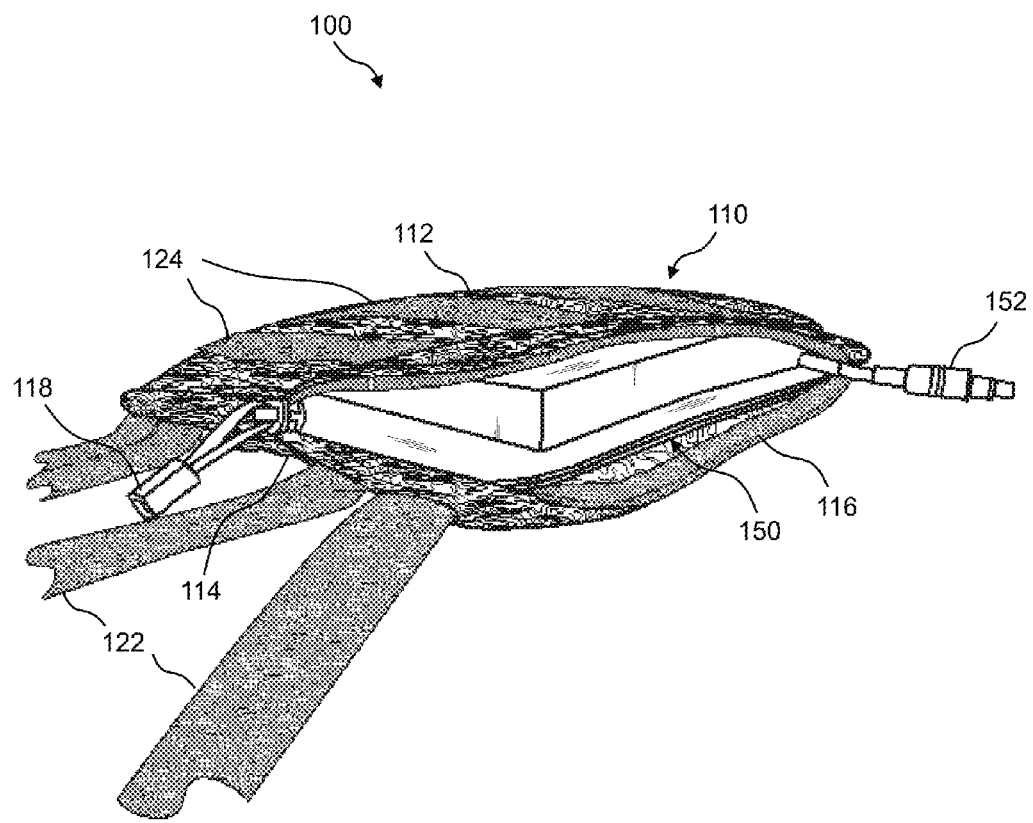
Figure 2:
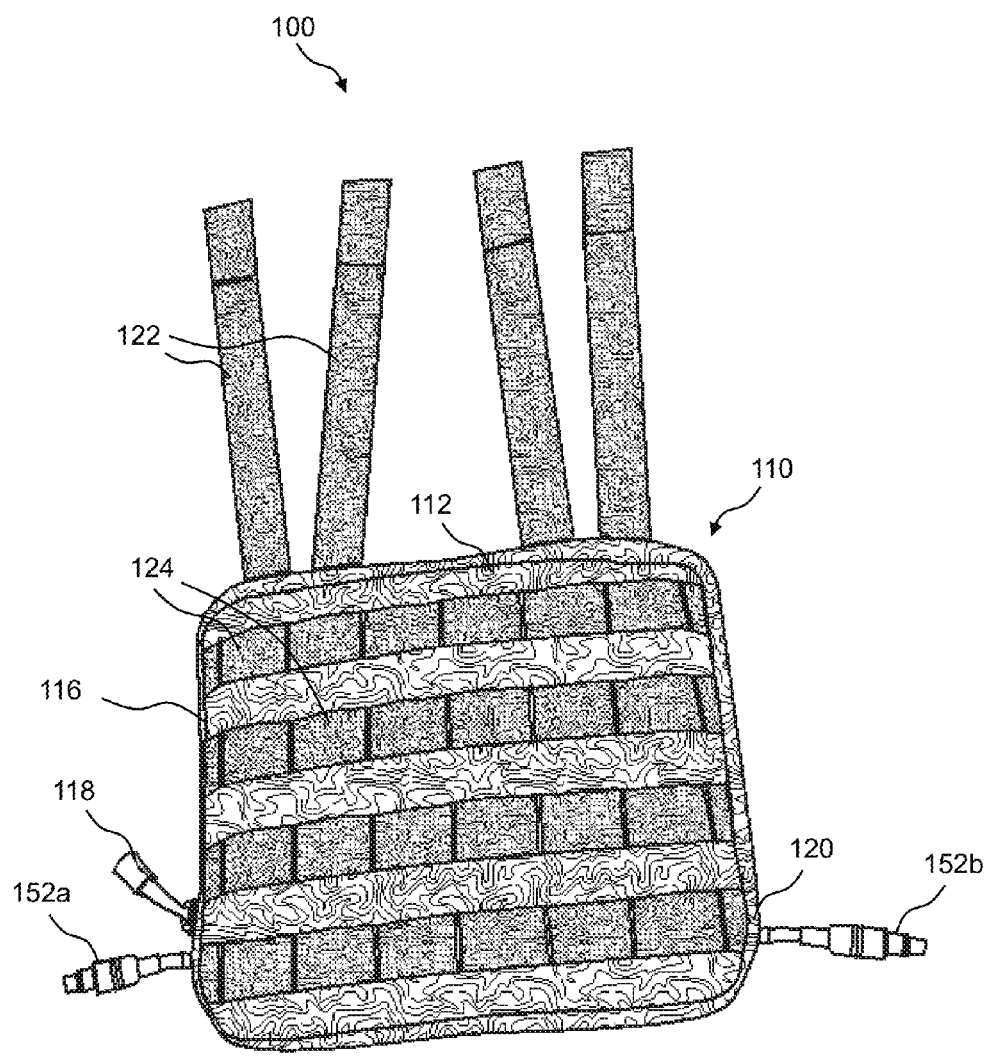
Figure 3:
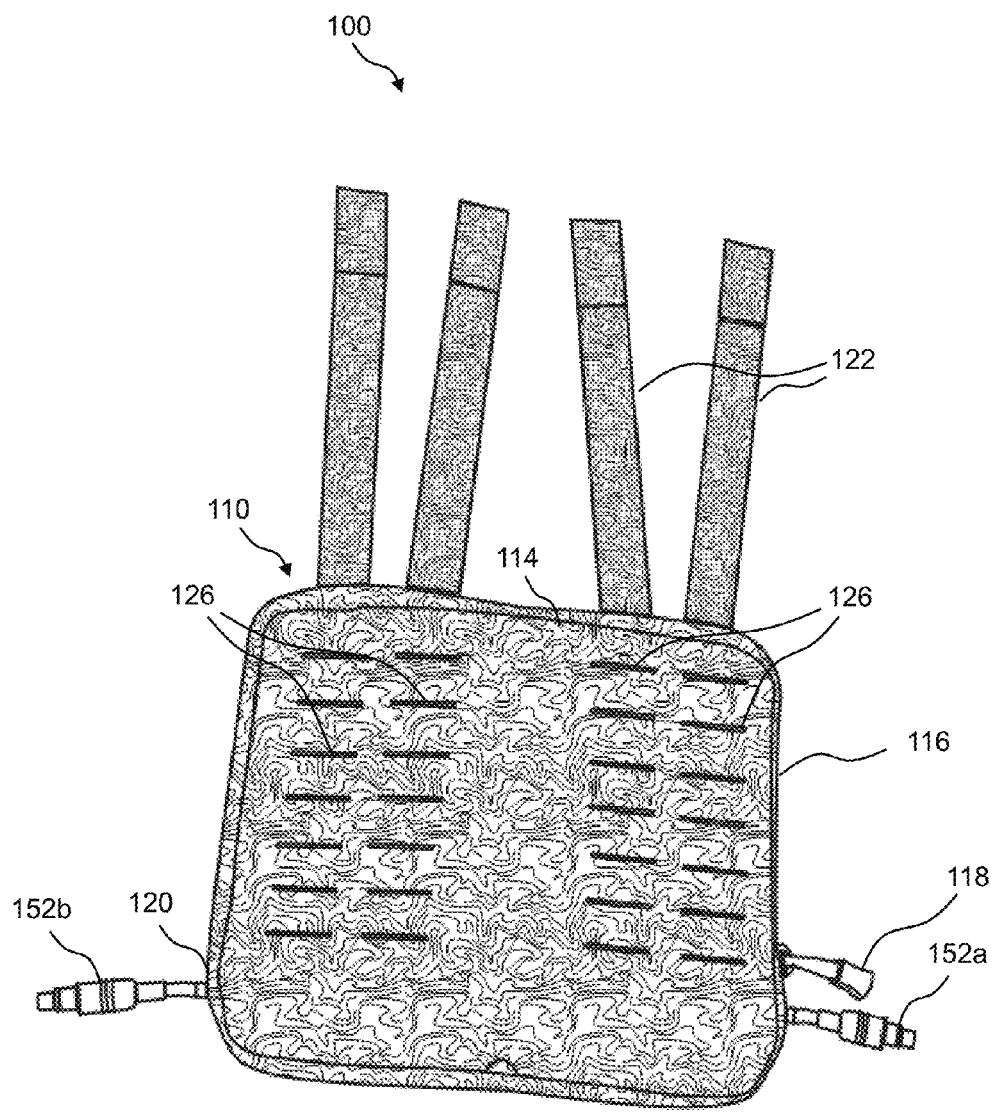
Figure 4:
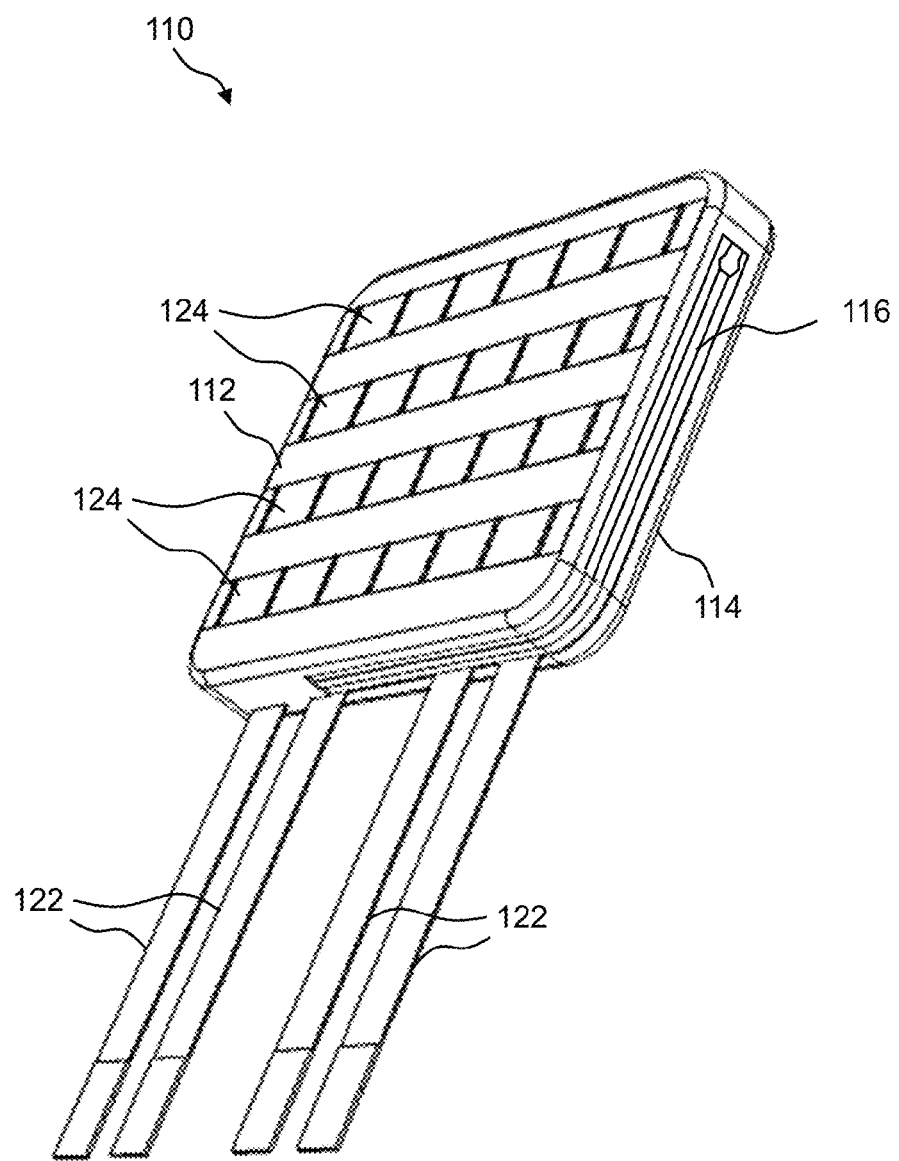
Figure 5:
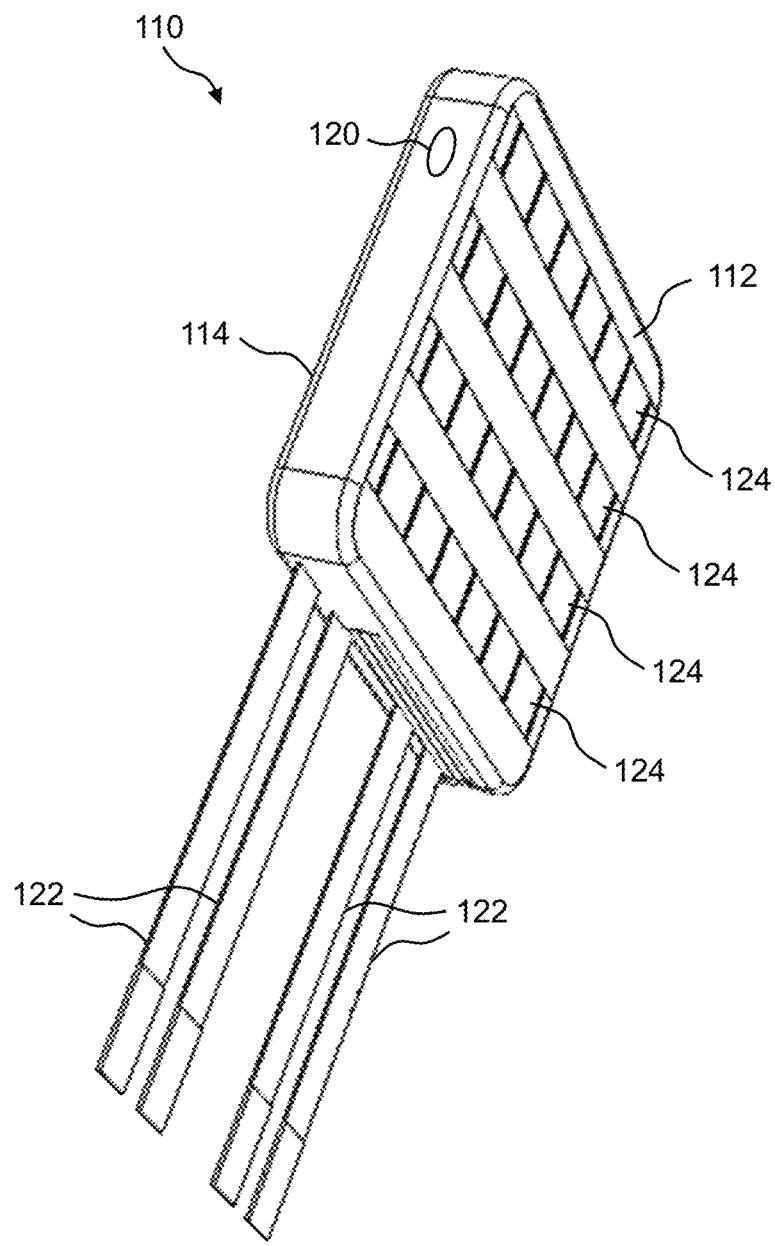
Figure 6:
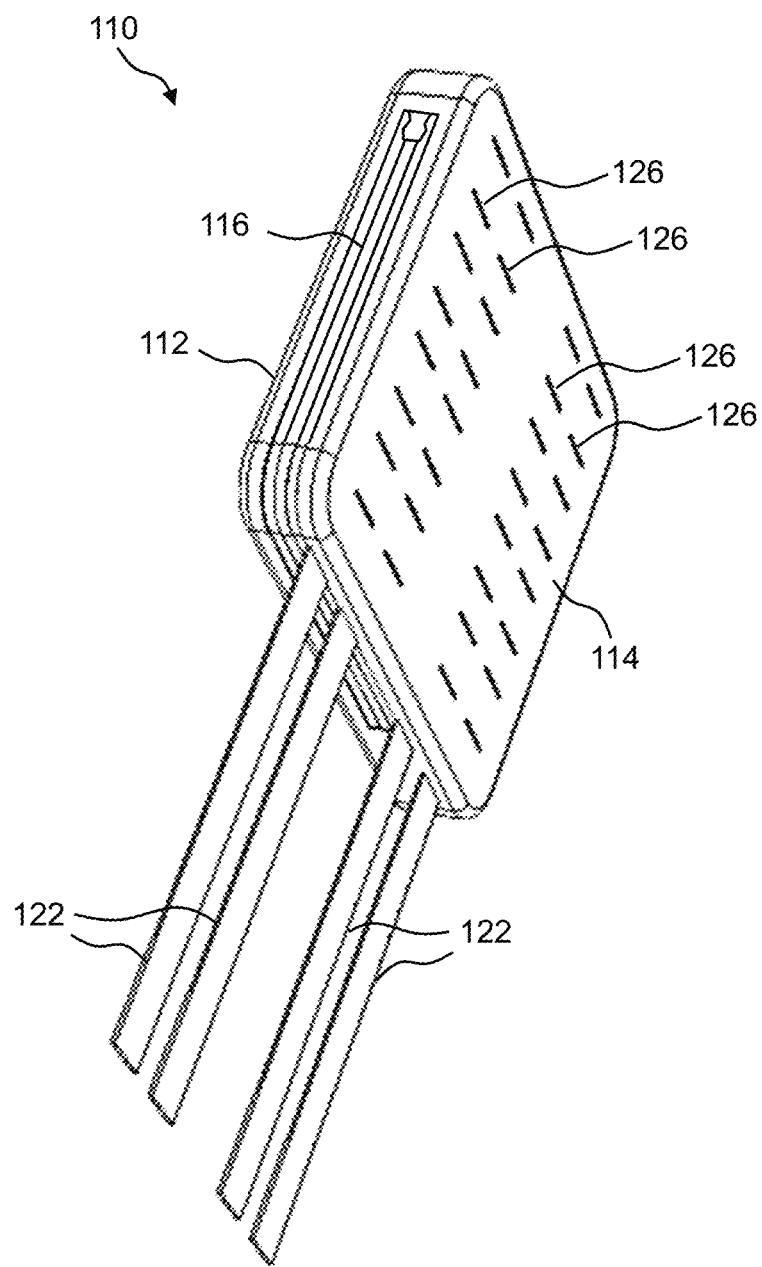
Figure 7:
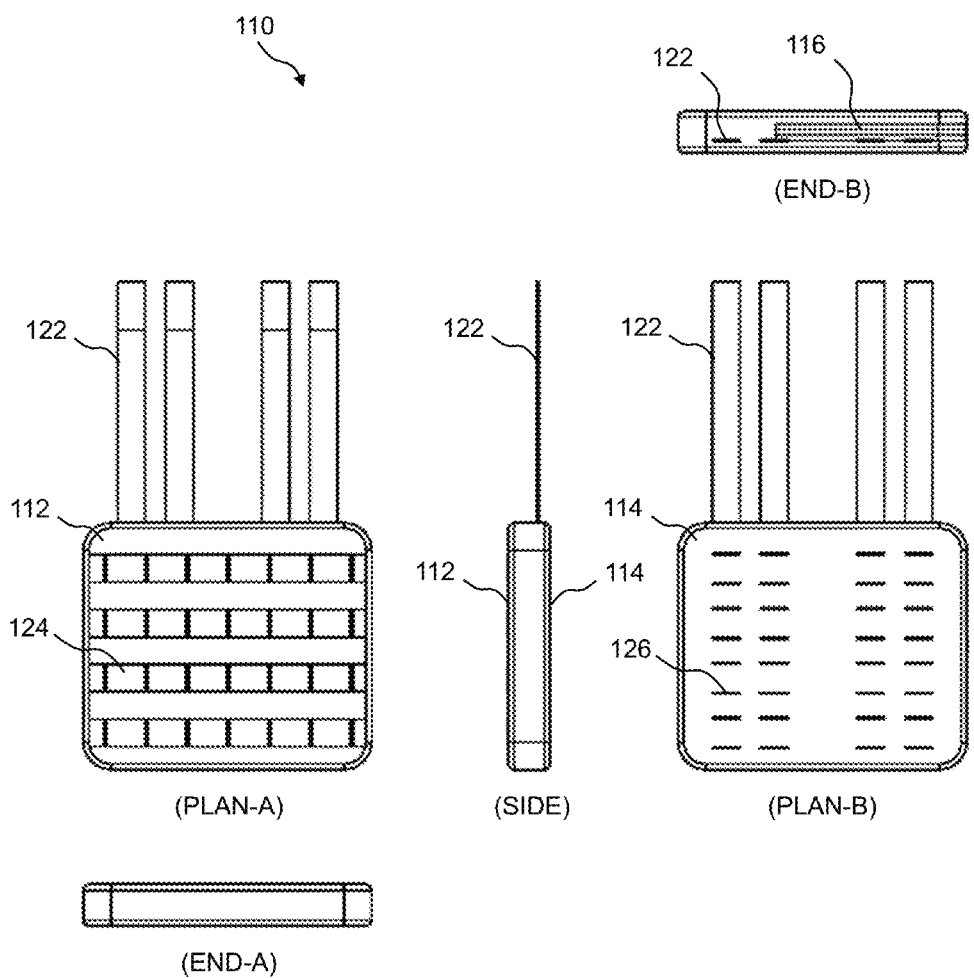
Figure 8:
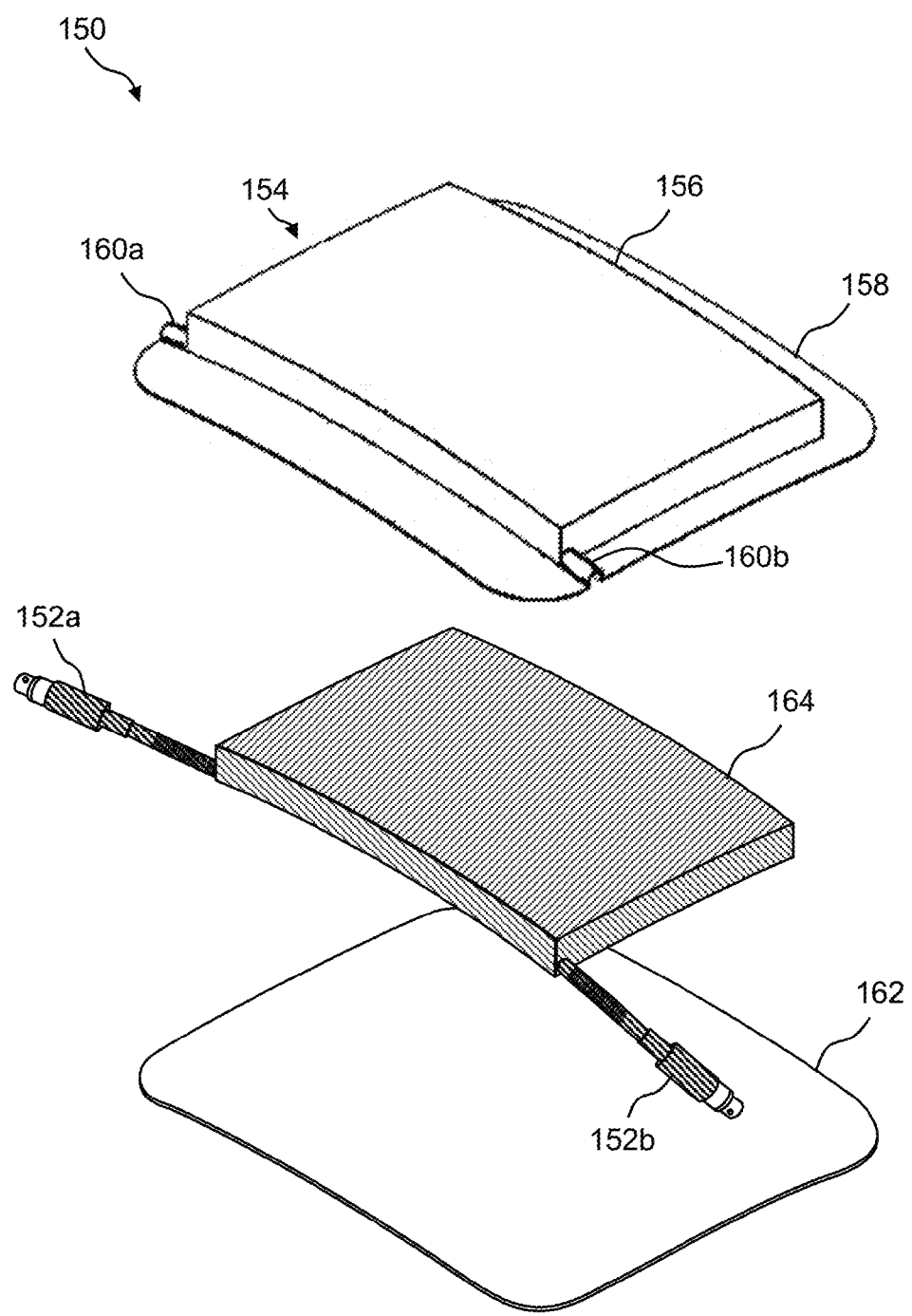
Figure 9:
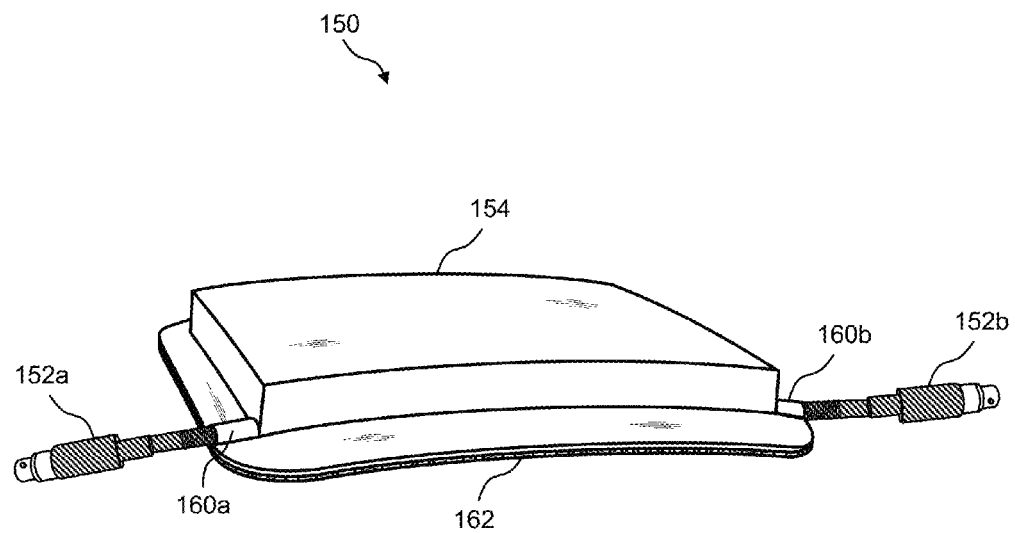
Figure 10:
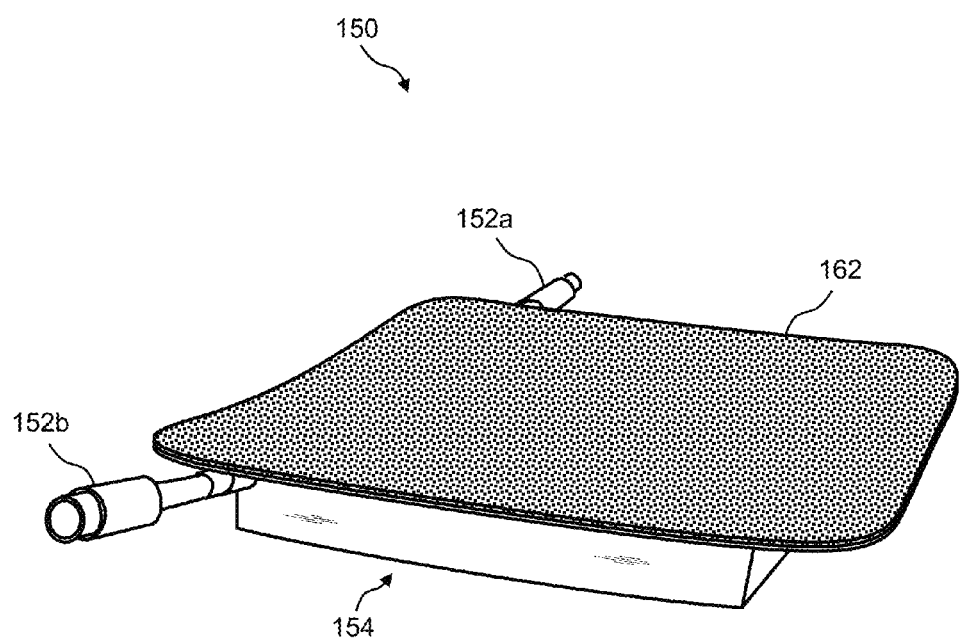
Figure 11:
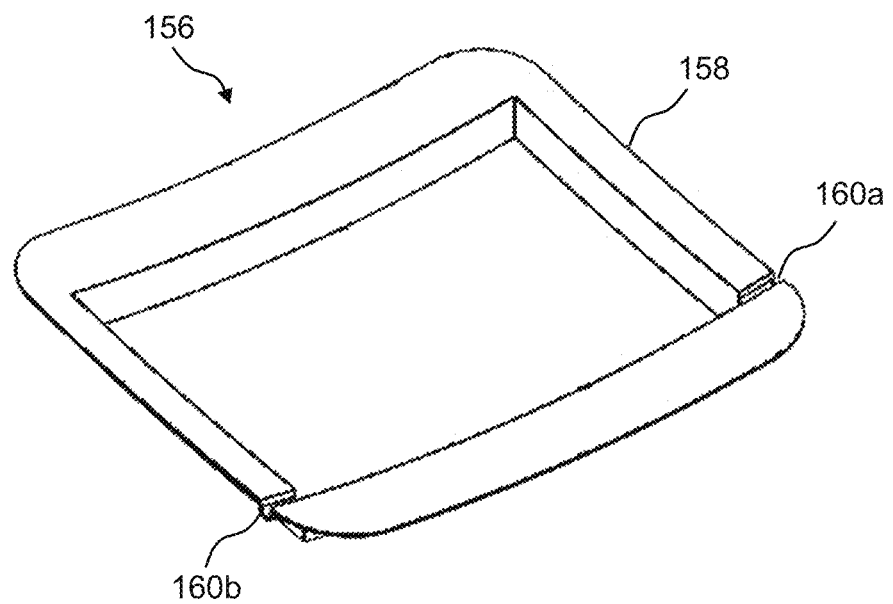
Figure 12:
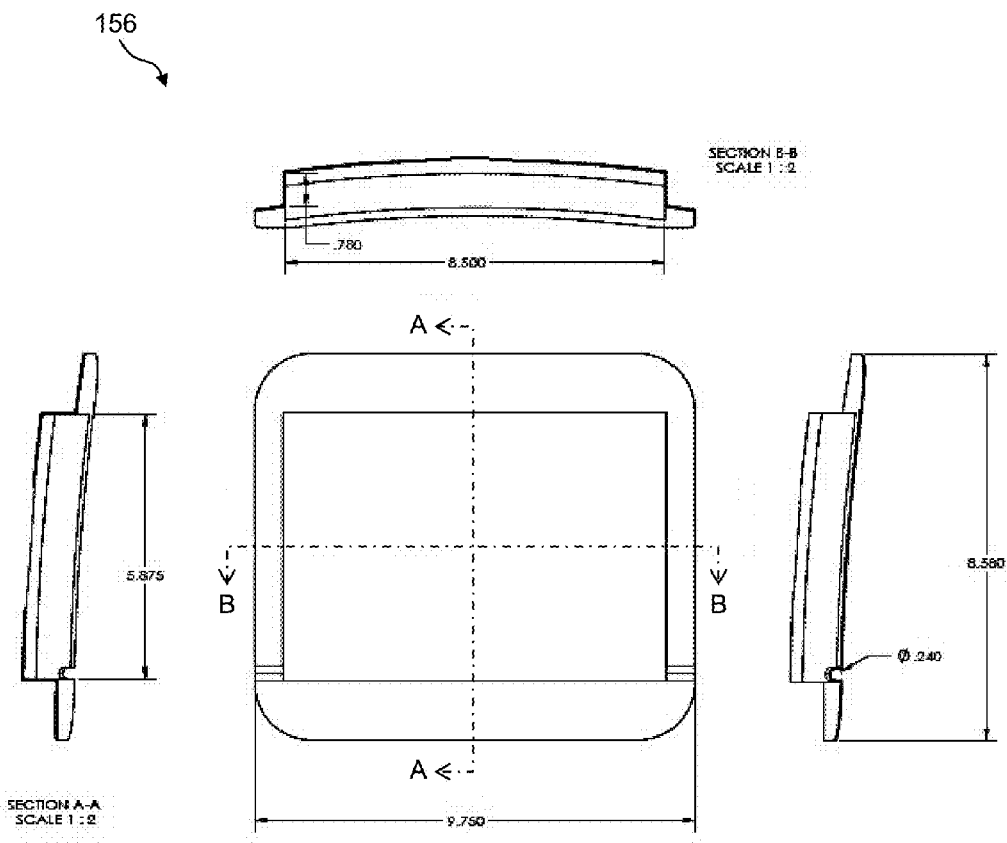
Figure 13:
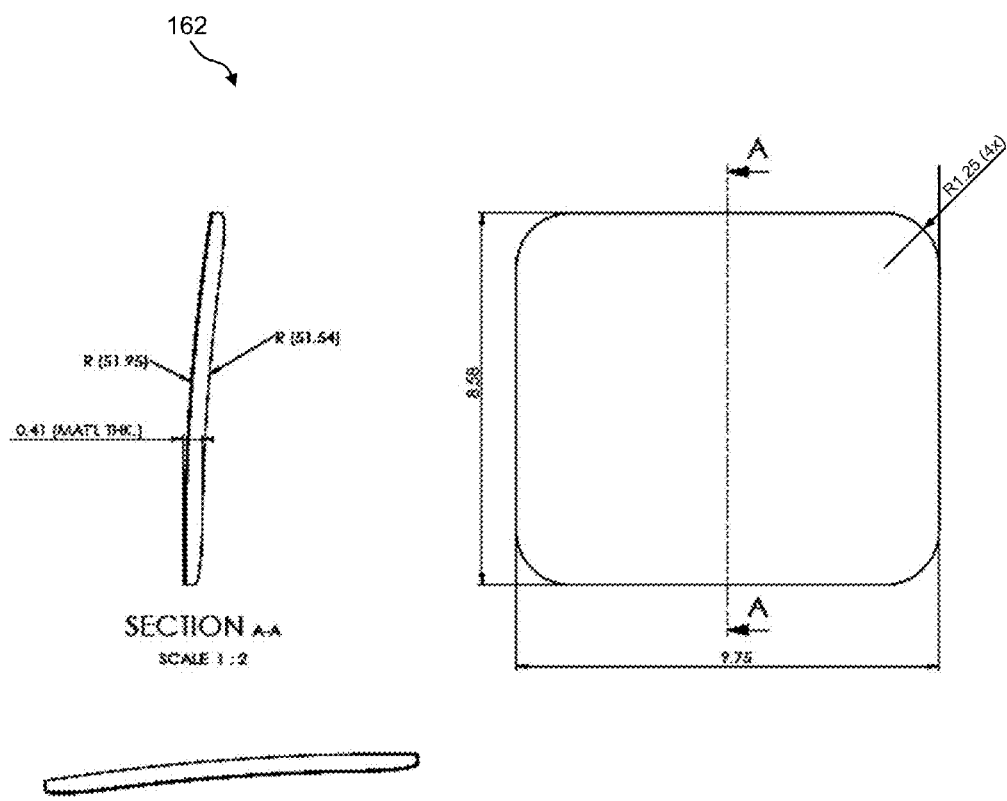
Figure 14:
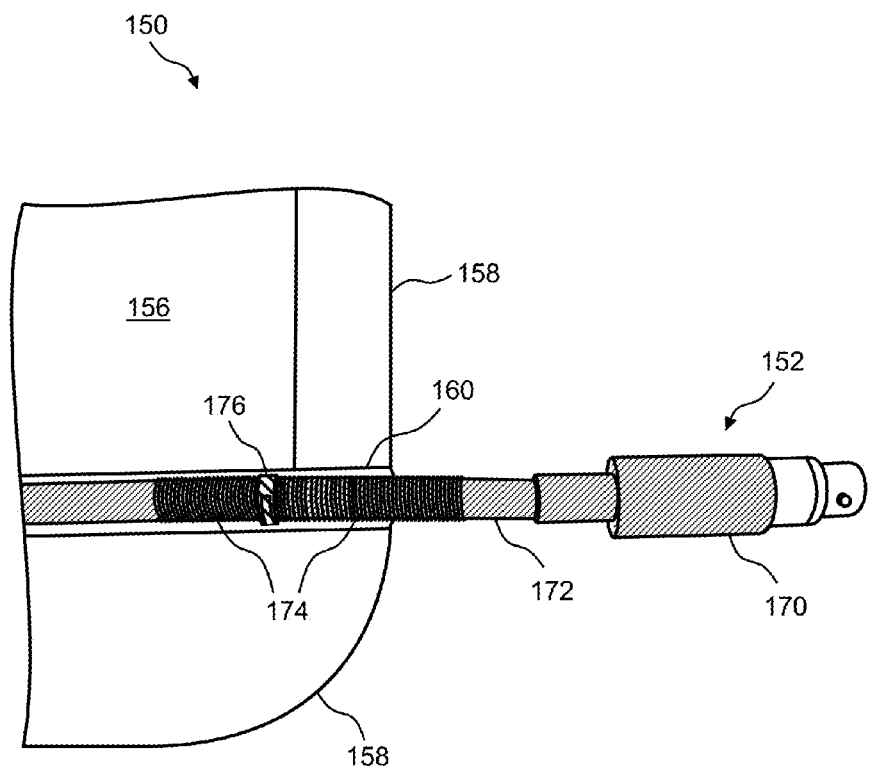

Having thus described the presently disclosed subject matter in general terms, reference will now be made to the accompanying Drawings, which are not necessarily drawn to scale, and wherein:

FIG. 1, FIG. 2, and FIG. 3 illustrate perspective views of an example of the presently disclosed portable battery pack that comprises a battery enclosed by a wearable pouch or skin;

FIG. 4, FIG. 5, and FIG. 6 illustrate perspective views of an example of the wearable pouch or skin of the presently disclosed portable battery pack;

FIG. 7 illustrates various other views of the wearable pouch or skin of the presently disclosed portable battery pack;

FIG. 8 illustrates an exploded view of an example of the battery of the presently disclosed portable battery pack;

FIG. 9 and FIG. 10 illustrate perspective views of the battery of the presently disclosed portable battery pack when assembled;

FIG. 11 illustrates a perspective view of the battery cover of the presently disclosed portable battery pack;

FIG. 12 illustrates various other views of the battery cover of the presently disclosed portable battery pack;

FIG. 13 illustrates various views of the back plate of the battery of the presently disclosed portable battery pack; and FIG. 14 illustrates a cutaway view of a portion of the battery, which shows more details of the flexible omnidirectional battery leads.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a portable battery pack comprising a battery enclosed by, e.g., inside of, a wearable and replaceable pouch or skin, wherein the pouch or skin can be provided in different colors and/or patterns. Namely, a set of multiple interchangeable pouches or skins can be provided with one battery unit. This feature is particularly beneficial when it is required that the portable battery pack blend into different environments, such as in military applications. In one example, if the portable battery pack is used in a jungle or wilderness environment, the battery can be placed inside a camouflage pouch or skin. In another example, if the portable battery pack is used in an artic environment, the battery can be placed inside a white-colored pouch or skin. In yet another example, if the portable battery pack is used in a desert environment, the battery can be placed inside a sand-colored pouch or skin.

Representative camouflages include, but are not limited to, universal camouflage pattern (UCP), also known as ACUPAT or ARPAT or Army Combat Uniform; MultiCam, also known as Operation Enduring Freedom Camouflage Pattern (OCP); Universal Camouflage Pattern-Delta (UCP-Delta); Airman Battle Uniform (ABU); Navy Working Uniform (NWU), including variants, such as blue-grey, desert (Type II), and woodland (Type III); MARPAT, also known asMarine Corps Combat Utility Uniform, including woodland, desert, and winter/snow variants; Disruptive Overwhite Snow digital camouflage; and Tactical Assault Camouflage (TACAM).

Therefore, an aspect of the presently disclosed portable battery pack is that it provides a battery in combination with one or more wearable and replaceable pouches or skins, wherein the one or more pouches or skins can be different colors and/or patterns.

Another aspect of the presently disclosed portable battery pack is that the battery has one or more leads that can be flexed in any direction and are reliable.

Yet another aspect of the presently disclosed portable battery pack is that the battery and pouch or skin are lightweight and contoured for comfortable wearing or ease of fastening to other equipment, such as a backpack or to body armor.

Still another aspect of the presently disclosed portable battery pack is that the pouch or skin can be MOLLE-compatible. "MOLLE" means Modular Lightweight Load-carrying Equipment, which is the current generation of load-bearing equipment and backpacks utilized by a number of NATO armed forces.

Referring now to FIG. 1, FIG. 2, and FIG. 3 are perspective views of an example of the presently disclosed portable battery pack 100 that comprises a battery enclosed by a wearable pouch or skin. For example, portable battery pack 100 comprises a pouch 110 for holding a battery 150. Pouch 110 is a wearable pouch or skin that can be sized in any manner that substantially corresponds to a size of battery 150. In one example, pouch 110 is sized to hold a battery 150 that is about 9.75 inches long, about 8.6 inches wide, and about 1 inch thick.

Pouch 110 can be formed of any flexible, durable, and substantially waterproof or at least water resistant material. For example, pouch 110 can be formed of polyester, polyvinyl chloride (PVC)-coated polyester, vinyl-coated polyester, nylon, canvas, PVC-coated canvas, or polycotton canvas. The exterior finish of pouch 110 can be any color, such as white, brown, or green, or any pattern, such as camouflage, as provided herein, or any other camouflage in use by the military. For example, in FIG. 1, FIG. 2, and FIG. 3, pouch 110 is shown to have a camouflage pattern.

Pouch 110 has a first side 112 and a second side 114. Pouch 110 also comprises an opening 116, which is the opening through which battery 150 is fitted into pouch 110. In one example, opening 116 is opened and closed using a zipper, as such pouch 110 includes a zipper tab 118. Other mechanisms, however, can be used for holding opening 116 of pouch 110 open or closed, such as, a hook and loop system (e.g., Velcro®), buttons, snaps, hooks, and the like. Further, an opening 120 (see FIG. 2, FIG. 3, FIG. 5) is provided on the end of pouch 110 that is opposite opening 116. For example, opening 120 can be a 0.5-inch long slit or a 0.75-inch long slit in the edge of pouch 110.

In one example, battery 150 is a rechargeable battery that comprises two leads 152 (e.g., leads 152a, 152b). Each lead 152 can be used for both the charging function and the power supply function. In other words, leads 152a, 152b are not dedicated to the charging function only or the power supply function only, both leads 152a, 152b can be used for either function at any time. In one example, one lead 152 can be used for charging battery 150 while the other lead 152 can be used simultaneously for powering equipment, or both leads 152 can be used for powering equipment, or both leads 152 can be used for charging battery 150.

With respect to using battery 150 with pouch 110, first the user unzips opening 116, then the user inserts one end of battery 150 that has, for example, lead 152b through opening 116 and into the compartment inside pouch 110. At the same time, the user guides the end of lead 152b through opening 120, which allows the housing of battery 150 to fit entirely inside pouch 110, as shown in FIG. 1. Lead 152a is left protruding out of the unzipped opening 116. Then the user zips opening 116 closed, leaving zipper tab 118 snugged up against lead 152a, as shown in FIG. 2 and FIG. 3. Namely, FIG. 2 shows portable battery pack 100 with side 112 of pouch 110 up, whereas FIG. 3 shows portable battery pack 100 with side 114 of pouch 110 up.

Referring again to FIG. 1, FIG. 2, and FIG. 3, pouch 110 of portable battery pack 100 can be MOLLE-compatible. Namely, pouch 110 incorporates a pouch attachment ladder system (PALS), which is a grid of webbing used to attach smaller equipment onto load-bearing platforms, such as vests and backpacks. For example, the PALS grid consists of horizontal rows of 1-inch (2.5 cm) webbing, spaced about one inch apart, and reattached to the backing at 1.5-inch (3.8 cm) intervals. Accordingly, a set of straps 122 (e.g., four straps 122) are provided on one edge of pouch 110 as shown. Further, four rows of webbing 124 are provided on side 112 of pouch 110, as shown in FIG. 2. Additionally, four rows of slots or slits 126 are provided on side 114 of pouch 110, as shown in FIG. 3.

Referring now to FIG. 4, FIG. 5, and FIG. 6 are perspective views of an example of wearable pouch 110 of the presently disclosed portable battery pack 100. Namely, FIG. 4 shows details of side 112 of pouch 110 and of the edge of pouch 110 that includes opening 116. FIG. 4 shows opening 116 in the zipper closed state. Again, four rows of webbing 124 are provided on side 112 of pouch 110. FIG. 5 also shows details of side 112 of pouch 110, but showing the edge of pouch 110 that includes opening 120. FIG. 6 shows details of side 114 of pouch 110 and shows the edge of pouch 110 that includes opening 116. FIG. 6 shows opening 116 in the zipped closed state. Again, four rows of slots or slits 126 are provided on side 114 of pouch 110.

Referring now to FIG. 7 is various other views of wearable pouch 110 of the presently disclosed portable battery pack 100. Namely, FIG. 7 show a plan view A, which is side 112 of pouch 110; a plan view B, which is side 114 of pouch 110; a side view; an end view A, which is the non-strap end of pouch 110; and an end view B, which is the strap 112-end of pouch 110.

Referring now to FIG. 8 is an exploded view of an example of battery 150 of the presently disclosed portable battery pack 100. Battery 150 includes a battery element 164 that is housed between a battery cover 154 and a back plate 162. Battery element 164 supplies leads 152a, 152b. In one example, the output of battery element 164 can be from about 5 volts DC to about 90 volts DC at from about 0.25 amps to about 10 amps.

Battery cover 154 comprises a substantially rectangular compartment 156 that is sized to receive battery element 164. A top hat style rim 158 is provided around the perimeter of compartment 156. Additionally, two channels 160 (e.g., channels 160a, 160b) are formed in battery cover 154 (one on each side) to accommodate the wires of leads 152a, 152b passing therethrough. More details of leads 152 and battery cover 154 are shown and described herein below with reference to FIG. 14.

Battery cover 154 and back plate 162 can be formed of plastic using, for example, a thermoform process or an injection molding. Back plate 162 can be mechanically attached to rim 158 of battery cover 154 via, for example, an ultrasonic spot welding process or an adhesive. Additionally, a water barrier material, such as silicone, may be applied to the mating surfaces of rim 158 and back plate 162. Battery cover 154, back plate 162, and battery element 164 can have a slight curvature or contour for conforming to, for example, the user's vest, backpack, or body armor. More details of battery cover 154 are shown and described herein below with reference to FIG. 11 and FIG. 12. More details of back plate 162 are shown and described herein below with reference to FIG. 13.

Referring now to FIG. 9 and FIG. 10 are perspective views of battery 150 of the presently disclosed portable battery pack 100 when fully assembled. Namely, FIG. 9 show a view of the battery cover 154-side of battery 150, while FIG. 10 shows a view of the back plate 162-side of battery 150.

Referring now to FIG. 11 is a perspective view of the side of battery cover 154 that faces battery element 164, while FIG. 12 shows various other views of battery cover 154 of battery 150 of the presently disclosed portable battery pack 100. Namely, FIG. 12 shows example dimensions of battery cover 154. Referring now to FIG. 13 is various views of back plate 162 of battery 150 and showing the contour and example dimensions of back plate 162. In one example, back plate 162 is about 9.75 inches long, about 8.6 inches wide, and about 0.4 inches thick.

Referring now to FIG. 14 is a cutaway view of a portion of battery 150, which shows more details of the flexible omnidirectional battery leads 152. Each lead 152 comprises a connector portion 170 and a wiring portion 172. Connector portion 170 can be any type or style of connector needed to mate to the equipment to be used with battery 150 of portable battery pack 100. Wiring portion 172 is electrically connected to battery element 164.

Wiring portion 172 is fitted into channel 160 formed in battery cover 154 such that connector portion 170 extends away from battery cover 154. A spring 174 is provided around wiring portion 172, such that a portion of spring 174 is inside battery cover 154 and a portion of spring 174 is outside battery cover 154. In one example, spring 174 is a steel spring that is from about 0.25 inches to about 1.5 inches long. Wiring portion 172 of lead 152 and spring 174 are held securely in channel 160 of battery cover 154 via a clamping mechanism 176.

The presence of spring 174 around wiring portion 172 of lead 152 allows lead 152 to be flexed in any direction for convenient connection to equipment from any angle. The presence of spring 174 around wiring portion 172 of lead 152 also allows lead 152 to be flexed repeatedly without breaking and failing. The design of leads 152 provides benefit over conventional leads and/or connectors of portable battery packs that are rigid, wherein conventional rigid leads allow connection from one angle only and are prone to breakage if bumped.

In summary and referring now to FIG. 1 through FIG. 14, the presently disclosed subject matter provides a portable battery pack comprising a wearable pouch adapted to enclose one or more batteries, wherein the pouch has a first side and an opposite second side, a closable opening through which the one or more batteries can be fitted into the pouch, one or more openings through which one or more leads from the one or more batteries can be accessed, and wherein the pouch comprises a pouch attachment ladder system (PALS) adapted to attach the pouch to a load-bearing platform.

In some embodiments, the pouch comprises a flexible, durable, and substantially waterproof and/or water resistant material. In particular embodiments, the material comprising the pouch is selected from the group consisting of polyester, polyvinyl chloride (PVC)-coated polyester, vinyl-coated polyester, nylon, canvas, PVC-coated canvas, and polycotton canvas.

In yet more particular embodiments, the pouch comprises an exterior finish comprising a camouflage pattern. In representative embodiments, the camouflage pattern is selected from the group consisting of universal camouflage pattern (UCP), MultiCam, Universal Camouflage Pattern-Delta (UCP-Delta), Airman Battle Uniform (ABU), Navy Working Uniform (NWU), MARPAT, Disruptive Overwhite Snow digital camouflage, and Tactical Assault Camouflage (TACAM).

In some embodiments, the closable opening can be closed by a mechanism selected from the group consisting of a zipper, a hook and loop system, one or more buttons, one or more snaps, and one or more hooks.

In particular embodiments, the load-bearing platform is selected from the group consisting of a vest, a backpack, and body armor. In certain embodiments, the portable battery pack is Modular Lightweight Load-carrying Equipment (MOLLE)-compatible. In yet more certain embodiments, the pouch attachment ladder system comprises a plurality of straps, a plurality of horizontal rows of webbing, a plurality of slits, and combinations thereof.

In some embodiments, the one or more batteries comprise a battery element, a battery cover, a battery back plate. In particular embodiments, one or more of the battery element, battery cover, and battery back plate have a curvature or contour adapted to conform to a curvature or contour of the load-bearing platform.

In further embodiments, the one or more batteries comprise one or more flexible omnidirectional leads, wherein each lead comprises a connection portion and a wiring portion, and wherein at least a portion of the wiring portion is encompassed by a flexible spring.

In certain embodiments, the battery has a length having a range from about 12 inches to about 8 inches, a width having a range from about 10 inches to about 7 inches, and a thickness having a range from about 2 inches to about 0.5 inches.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A portable battery pack comprising:
    a wearable pouch and one or more batteries enclosed in the wearable pouch;
    wherein the one or more batteries include:
        a battery element;
        a battery cover including one or more channels to accommodate wires of one or more flexible omnidirectional leads, a rectangular compartment sized to receive the battery element, and a top hat style rim around an entire perimeter of the battery cover;
        a battery back plate attached to the top hat style rim of the battery cover; and
        the one or more flexible omnidirectional leads including a connection portion and a wiring portion, wherein a flexible spring is provided around the wiring portion, wherein the wiring portion and the flexible spring are held securely in the one or more channels in the battery cover via a clamping mechanism such that a portion of the flexible spring is positioned inside the battery cover and a portion of the flexible spring is positioned outside the battery cover;
    wherein the wearable pouch includes:
        a closeable opening through which the one or more batteries are operable to be removed from the wearable pouch;
        one or more openings through which the one or more flexible omnidirectional leads from the one or more batteries can be accessed; and
        a pouch attachment ladder system (PALS) operable to attach the wearable pouch to a load-bearing platform.

2. The portable battery pack of claim 1, wherein the wearable pouch comprises a flexible, durable, and waterproof and/or water resistant material.

3. The portable battery pack of claim 2, wherein the material comprising the wearable pouch is selected from the group consisting of polyester, polyvinyl chloride (PVC)-coated polyester, vinyl-coated polyester, nylon, canvas, PVC-coated canvas, and polycotton canvas.

4. The portable battery pack of claim 1, wherein the wearable pouch comprises an exterior finish comprising a camouflage pattern.

5. The portable battery pack of claim 4, wherein the camouflage pattern is selected from the group consisting of universal camouflage pattern (UCP), MultiCam, Universal Camouflage Pattern-Delta (UCP-Delta), Airman Battle Uniform (ABU), Navy Working Uniform (NWU), MARPAT, Disruptive Overwhite Snow digital camouflage, and Tactical Assault Camouflage (TACAM).

6. The portable battery pack of claim 1, wherein the closable opening can be closed by a mechanism selected from the group consisting of a zipper, a hook and loop system, one or more buttons, one or more snaps, and one or more hooks.

7. The portable battery pack of claim 1, wherein the load-bearing platform is selected from the group consisting of a vest, a backpack, and body armor.

8. The portable battery pack of claim 1, wherein the portable battery pack is Modular Lightweight Load-carrying Equipment (MOLLE)-compatible.

9. The portable battery pack of claim 1, wherein the pouch attachment ladder system comprises a plurality of straps, a plurality of horizontal rows of webbing, a plurality of slits, and combinations thereof.

10. The portable battery pack of claim 1, wherein one or more of the battery element, the battery cover, and the battery back plate have a curvature or a contour adapted to conform to a curvature or a contour of the load-bearing platform.

11. The portable battery pack of claim 1, wherein the one or more batteries have a length having a range from about 12 inches to about 8 inches, a width having a range from about 10 inches to about 7 inches, and a thickness having a range from about 2 inches to about 0.5 inches.

12. The portable battery pack of claim 1, wherein the one or more batteries are rechargeable.

13. The portable battery pack of claim 12, wherein the one or more leads are operable to charge the one or more batteries and supply power to one or more power consuming devices.

14. The portable battery pack of claim 1, wherein the one or more batteries have an output voltage from about 5 volts DC to about 90 volts DC at from about 0.25 amps to about 10 amps.

15. The portable battery pack of claim 1, wherein the battery cover and the battery back plate are comprised of plastic.

16. The portable battery pack of claim 1, further comprising a water barrier material applied to a mating surface of the battery back plate and the rim of the battery cover.

17. The portable battery pack of claim 16, wherein the water barrier material is silicone.

18. The portable battery pack of claim 1, wherein the flexible spring is comprised of steel.

19. The portable battery pack of claim 1, wherein the flexible spring is from about 0.25 inches to about 1.5 inches long.

20. The portable battery pack of claim 1, wherein the one or more flexible omnidirectional leads include two or more flexible omnidirectional leads, wherein at least one of the two or more omnidirectional leads is operable to charge the one or more batteries and at least one different omnidirectional lead of the two or more omnidirectional leads is operable to simultaneously power at least one power consuming device.

* * * * *